United States Patent
Fujimura et al.

(10) Patent No.: US 9,684,126 B2
(45) Date of Patent: Jun. 20, 2017

(54) OPTICAL MODULE HAVING MULTI-MODE COUPLER FORMED ON SEMICONDUCTOR SUBSTRATE

(71) Applicant: Sumitomo Electric Industries, Ltd., Osaka-shi (JP)

(72) Inventors: Yasushi Fujimura, Yokohama (JP);
Yutaka Moriyama, Yokohama (JP);
Masaru Takechi, Yokohama (JP);
Takehiko Kikuchi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/222,483

(22) Filed: Jul. 28, 2016

(65) Prior Publication Data

US 2017/0031099 A1    Feb. 2, 2017

(30) Foreign Application Priority Data

Jul. 29, 2015  (JP) ................. 2015-149271

(51) Int. Cl.
G02B 6/12          (2006.01)
G02B 6/42          (2006.01)

(52) U.S. Cl.
CPC ........ G02B 6/12004 (2013.01); G02B 6/4232 (2013.01); G02B 6/4298 (2013.01); G02B 6/1203 (2013.01)

(58) Field of Classification Search
None
See application file for complete search history.

(56) References Cited

U.S. PATENT DOCUMENTS

| 5,327,517 A * | 7/1994 | Yamada ................. G02B 6/30 385/137 |
| 6,021,149 A | 2/2000 | Miyazaki et al. |
| 2008/0187268 A1 | 8/2008 | Kaneko et al. |
| 2010/0158436 A1 | 6/2010 | Riska |
| 2010/0166427 A1 | 7/2010 | Jeong |
| 2012/0070113 A1 | 3/2012 | Ishii |
| 2012/0106984 A1 | 5/2012 | Jones et al. |
| 2012/0328236 A1 * | 12/2012 | Nasu .................... G02B 6/4267 385/14 |

(Continued)

FOREIGN PATENT DOCUMENTS

| JP | H5-210029 A | 8/1993 |
| JP | H6-331840 A | 12/1994 |

(Continued)

OTHER PUBLICATIONS

International Search Report and Written Opinion in counterpart International Application No. PCT/JP2016/003527, dated Oct. 25, 2016.

*Primary Examiner* — Mike Stahl
(74) *Attorney, Agent, or Firm* — Venable LLP; Michael A. Sartori; Laura G. Remus

(57) ABSTRACT

An optical module that implements an MMI device including an optical hybrid primarily made of semiconductor material is disclosed. The MMI device, which has a rectangular plane shape and includes multi-mode couplers, is mounted on a carrier. The carrier provides a step extending in a whole lateral width of a top surface thereof, where the step makes a gap against the MMI device in an area where the MMI couplers are formed.

11 Claims, 10 Drawing Sheets

(56) References Cited

U.S. PATENT DOCUMENTS

| | | | |
|---|---|---|---|
| 2013/0330038 A1* | 12/2013 | Onishi | G02B 6/262 385/31 |
| 2014/0334775 A1 | 11/2014 | Konishi et al. | |
| 2015/0177457 A1* | 6/2015 | Kasahara | G02B 6/42 385/14 |

FOREIGN PATENT DOCUMENTS

| | | |
|---|---|---|
| JP | 2010-171922 A | 8/2010 |
| JP | 2012-068399 A | 4/2012 |
| JP | 2014-115416 A | 6/2014 |

* cited by examiner

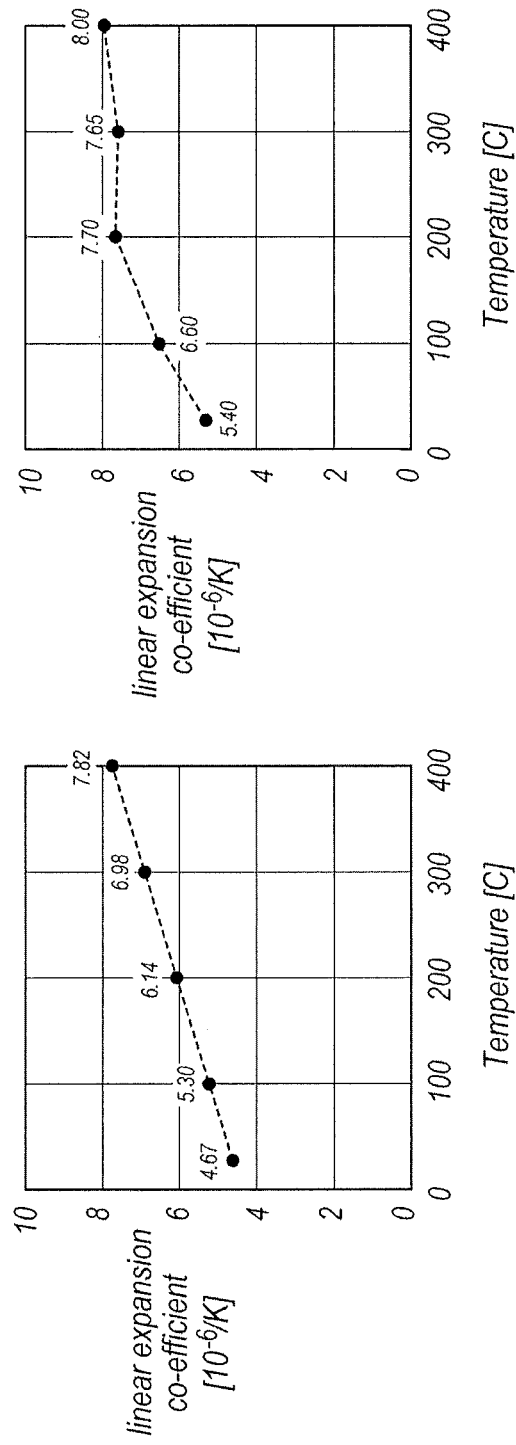

OPTICAL MODULE HAVING MULTI-MODE COUPLER FORMED ON SEMICONDUCTOR SUBSTRATE

BACKGROUND OF THE INVENTION

1. Field of the invention

The present application relates to an optical module.

2. Background Arts

A Japanese Patent laid open No. JP-2010-171922A has disclosed an optical device often called as 90° optical hybrid that includes a 2×4 multi-mode interference (MMI) coupler and a 2×2 MMI coupler. The former MMI coupler converts an optical signal modulated by an algorithm of the quadrature phase shift keying (QPSK), or the differential QPSK, into a first pair of optical signals and a second pair of optical signals, where the optical signals of the first pair are in-phase to each other, and the optical signal of the second pair are also in-phase to each other. The second MMI coupler converts one of the first pair of the optical signals and the second pair of the optical signals into a third pair of optical signals having quadrature phase to the one of the first pair and the second pair.

Recent eager requests to make optical devices smaller and higher in a density thereof have generated an optical hybrid that integrates an MMI coupler with photodiodes (PDs) on a substrate made of indium phosphide (InP). These optical hybrids are often mounted on a base through a carrier made of copper tungsten (CuW). However, differential outputs of an optical hybrid which is selected so as to show equalized differential outputs sometimes increase the equalized difference between the positive and negative phases. The present invention is to provide an optical module that suppresses the increase of the equalized difference between two outputs.

SUMMARY OF THE INVENTION

An aspect of the present invention relates to an optical module that comprises a multi-mode interference (MMI) device and a carrier. The MMI device includes a semiconductor substrate on which an MMI coupler and waveguides, where the waveguide longitudinally extend from the MMI coupler in a top surface of the semiconductor substrate. The carrier mounts the MMI device thereon through solder. A feature of the present optical module is that the MMI device has an area in a back surface of the semiconductor substrate and the area of the MMI device is not fixed to the carrier, overlaps with the MMI coupler in the top surface of the semiconductor substrate, and extends in an overall lateral width of the semiconductor substrate.

BRIEF DESCRIPTION OF THE DRAWINGS

The foregoing and other purposes, aspects and advantages will be better understood from the following detailed description of a preferred embodiment of the invention with reference to the drawings, in which:

FIG. 8A shows thermal expansion coefficients of indium phosphide (InP), and FIG. 8B shows those of alumina ($Al_2O_3$);

DESCRIPTION OF EMBODIMENTS

Next, embodiment according to the present invention will be described as referring to drawings. In the description of the drawings, numerals or symbols same with or similar to each other will refer to elements same with or similar to each other without duplicating explanations.

First Embodiment

Figure 1:
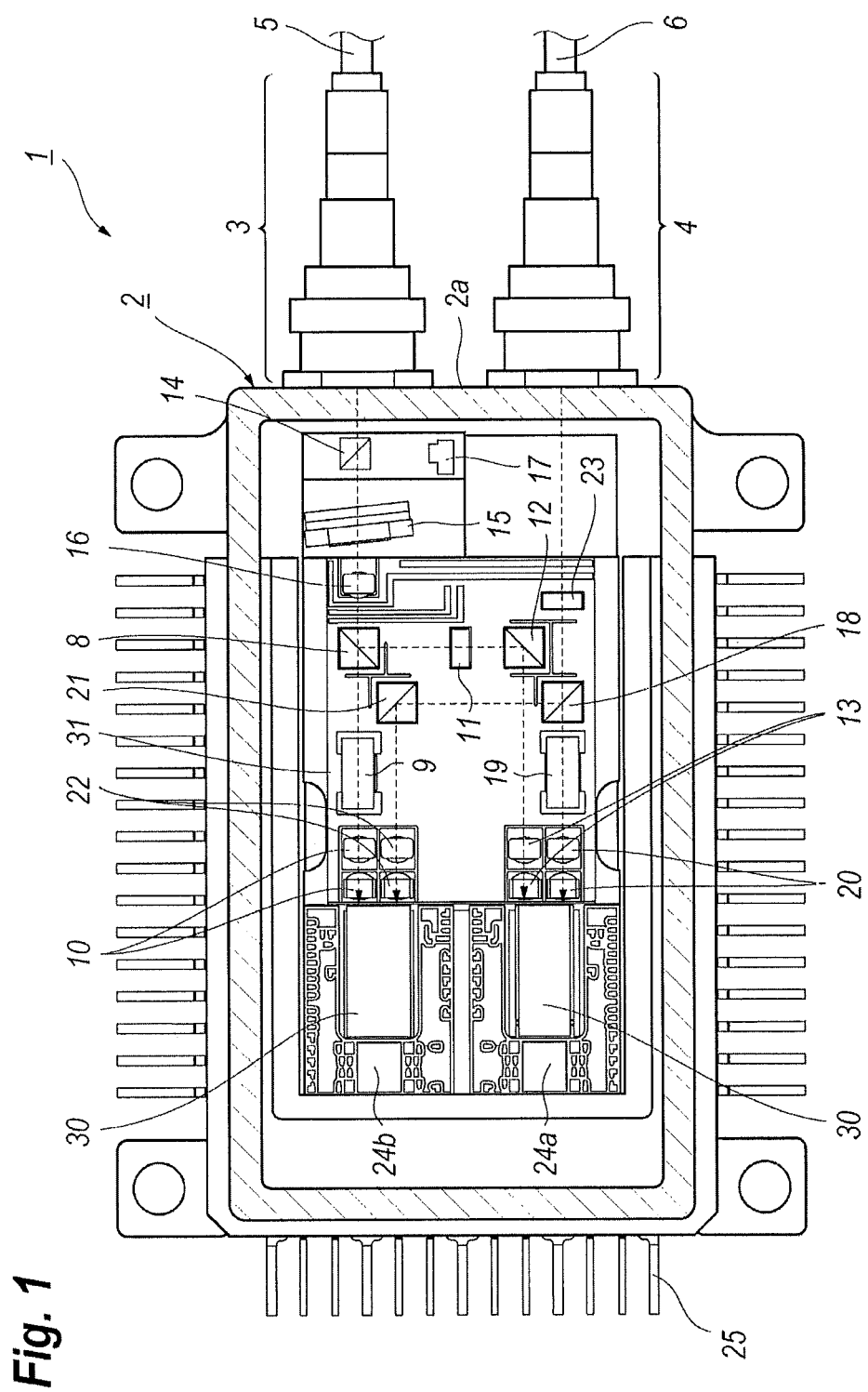
FIG. 1 is a plan view of an optical module according to embodiment of the present invention.

FIG. 1 is a plan view of an inside of an optical module 1 according to embodiment of the present invention. The optical module 1 provides a box-shaped housing 2 having a signal port 3 and a local port 4 in one side 2a of the housing 2. Descriptions below sometimes assume that a direction "forward" and/or "front" is a side where two ports, 3 and 4, are provided; while, another direction "rear" and/or "back" is a side opposite thereto. The signal port 3, which couples with a single mode fiber (SMF) 5, receives signal light from the SMF 5; while, the local port 4, which couples with a polarization maintaining fiber (PMF) 6, receives local light from the PMF 6. The signal light and the local light are brought within the housing 2 through the signal port 3 and the local port 4, respectively. The housing 2 also provides terminals 25 in rest sides except the front side 2a. The terminals 25 includes those for outputting data recovered from the signal light, those for supplying power and biases in electronic circuits implementing in the housing 2, and the ground.

The optical module 1 further provides two multi-mode interference (MMI) devices 30 and some optical components for coupling the two MMI devices 30 with respective ports, 3 and 4, where the optical components include a polarization beam splitter (PBS) 8, a beam splitter (BS) 18, skew adjustors, 9 and 19, a half-wave plate 11, two mirrors, 12 and 21, and four lens systems, 10, 13, 20, and 22. Moreover, the optical module 1 further provides, between the signal port 3 and the PBS 8, another BS 14, a variable optical attenuator (VOA) 15, and a collimating lens 16. The BS 14 splits the signal light coming from the signal port 3 into two beams, one of which is detected by a monitor photodiode (mPD) 17 that generates an electrical signal depending on magnitude of the signal light.

The BS 14 shows a split ratio of less than 10%, typically around 5%. The VOA 15 attenuates the signal light passing the BS 14, namely, rest portion of the signal light not split to the mPD 17. The VOA 15 may be controlled in the attenuation thereof by electrical signals externally provided out of the housing 2. For instance, when a system implementing the optical module 1 detects excess power in the signal light through the output of the mPD 17, the system increases the attenuation of the VOA 15, which decreases the power received by the MMI devices 30. The collimating lens 16 collimates the signal light passing the VOA 15. Specifically, the signal light is preferably concentrated by the lens held in a lens holder of the signal port 3 such that a beam waist of the concentrated signal light positions in the VOA 15. Thus, the field size of the signal light is enough concentrated compared with an aperture of the VOA 15. The collimating lens 16 may collimate thus concentrated signal light. Because the optical components provided in downstream of the VOA 15 are operable for a collimated beam, the MMI devices 30 may show enough optical coupling efficiency against the signal light.

The PBS 8 splits the signal light coming from the collimating lens 16 depending on the polarization. For instance, one component of the signal light having the polarization in parallel to a bottom of the housing 2 passes the PBS 8; while, rest component of the signal light whose polarization is perpendicular to the bottom of the housing is reflected at the PBS 8. The PBS 8 has a split ratio of 1:1, namely 50%. The relation of the pass and the reflection with respect to the polarization may be optional. The component of the signal light having the polarization perpendicular to the bottom of the housing 2 may pass the PBS 8; while, the rest component having the polarization in parallel to the bottom of the housing 2 may be reflected by the PBS 8.

The skew adjustor 9 and the first lens system 10, which are interposed between one of the MMI devices 30 and the PBS 8, may compensate an optical path length for the component of the signal light reflected at the PBS 8 and entering the other MMI device 30. That is, an optical path from the PBS 8 to the MMI device 30 is shorter than the other optical path from the PBS 8 to the other MMI device 30 by a distance from the PBS 8 to the first mirror 12. The component of the signal light passing the PBS 8 finally enters the MMI device 30 by passing the skew adjustor 9 and concentrated by the first lens system 10 including two lenses.

The half-wave plate 11, the first mirror 12, and the second lens system 13 are arranged on the optical path from the PBS 8 to the MMI device 30 for the other component of the polarization of the signal light. The other polarization component of the signal light reflected at the PBS 8 passes the half-wave plate 11, which rotates the polarization by 90°, that is, the other polarization component of the signal light passing the half-wave plate 11 has the polarization plane same with that for the component of the signal light passing the PBS 8. The other polarization component of the signal light passing the half-wave plate 11 enters the MMI device 30 reflected by the first mirror 12 by 90° and concentrated by the second lens system 13. The second lens system 13 also provides two lenses sequentially arranged along optical axes thereof. The first mirror 12 may be a type of cubic mirror, and/or a slab mirror.

The optical module 1 further provides, for optically coupling the local port 4 to two MMI devices 30, the BS 18, the skew adjustor 19, the third lens system 20, the second mirror 21, and the fourth lens system 22. Moreover, the optical module 1 further provides a polarizer 23 in the front end thereof, namely, between the local port 4 and the BS 18. The polarizer 23 may define the polarization plane of the local light coming from the local port 4. Several reasons may shift or rotate the polarization plane of the local light LO from the designed direction which is typically set in parallel or perpendicular to the bottom of the housing 2. Also, the local light is generally generated by a semiconductor laser diode (LD), and an LD naturally outputs laser light with an elliptical polarization, whose major axis is far greater than a minor axis. The polarizer 23 set in the front end of the optical system may align the polarization plane of the local light in the designed direction, namely, in perpendicular or parallel to the bottom of the housing 2.

The BS 18 splits the local light coming from the polarizer 23 into two portions, one of which passes the BS 18; while, the other is reflected thereat. Note that the BS 18 does not affect the polarization of the split light. That is, the local light passing the BS 18 and the other local light reflected at the BS 18 have the polarization plane same to each other. The BS 18 has a split ratio of 1:1, namely, 50%. The skew adjustor 19 and the third lens system 20 are interposed between the BS 18 and the MMI device 30. The skew adjustor 19, similar to the aforementioned skew adjuster 9, may compensate a skew caused by an optical path from the BS 18 and the second mirror 21. The local light passing the BS 18 enters the MMI device 30 passing the skew adjustor 19 and concentrated by the third lens system 20 that provides two lenses sequentially arranges along the optical axes thereof. The second mirror 21 and the fourth lens system 22 are interposed between the BS 18 and the MMI device 30. The portion of the local light reflected at the BS 18 reaches the local port of the MMI device 30 after reflected by the second mirror 21 again and concentrated by the fourth lens system 22. The fourth lens system 22, similar to the first to third lens system, 10, 13, and 20, provides two lenses sequentially arranged along the optical axis thereof. The second mirror 21 may be a type of cubic mirror, and/or slab mirror.

Thus, the signal light and the local light entering the optical module 1 from the respective ports, 3 and 4, reach the MMI devices 30 by the optical system described above. The MMI devices 30 of the present embodiment may have a type of, what is called, multi-mode optical hybrid monolithically integrating photodiodes (PDs) 26 on a semiconductor substrate made of indium phosphide (InP). Photocurrents generated by the PDs 26 in the MMI devices 30 are amplified, converted in respective voltage signals by amplifiers, 24a and 24b, placed behind the MMI devices 30 and output from the terminals 25.

Figure 2A:
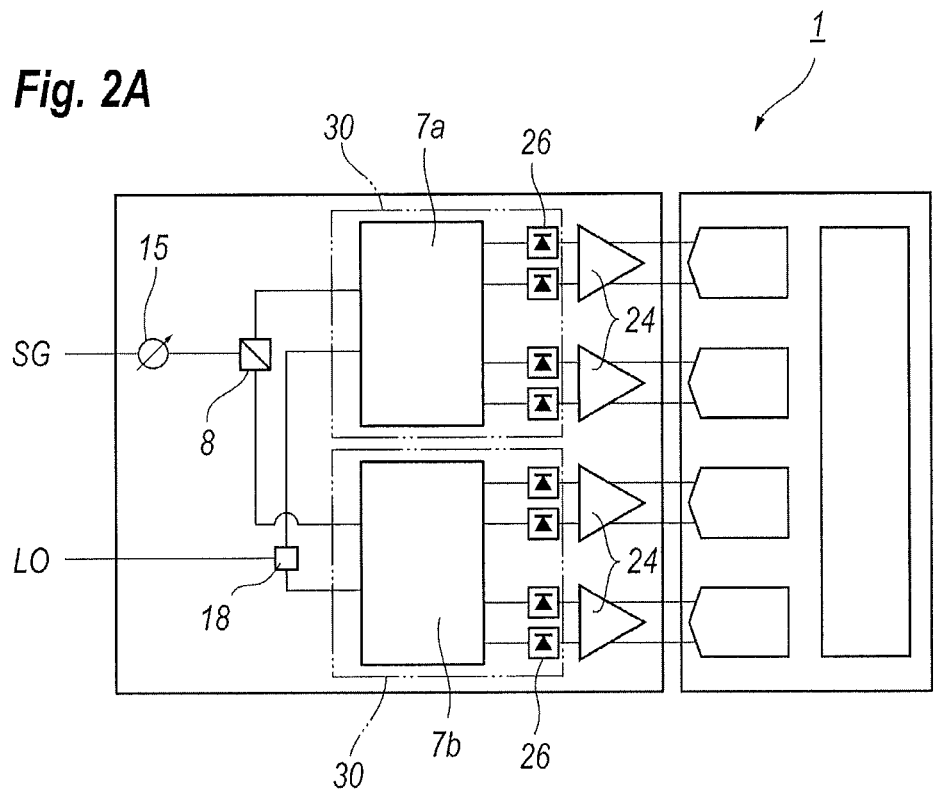
FIG. 2A shows a functional block diagram of the optical module.
Figure 2B:
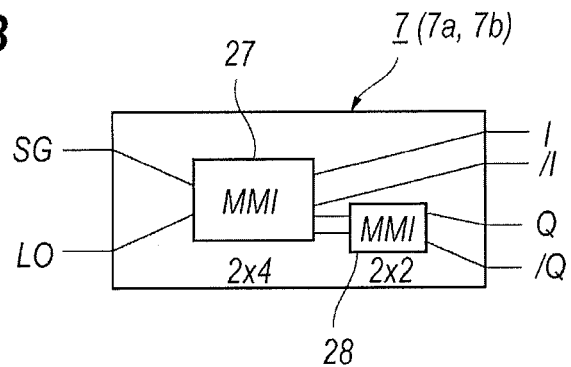
FIG. 2B shows an optical arrangement of an optical hybrid implemented in the optical module.

FIG. 2A schematically shows optical and electrical functional block diagram of the optical module 1, and FIG. 2B schematically shows a functional block diagram of an optical hybrid 7 integrated within the MMI device 30. The MMI device 30 includes multi-mode interference (MMI) couplers formed by planar waveguides and monolithically integrates PDs 26 in the rear end thereof that detect interferences of the signal light SG with the local light LO generated by the MMI couplers.

That is, referring to FIG. 2B, the optical hybrid, 7a or 7b, includes a 2×4 MMI coupler 27 and a 2×2 MMI coupler 28 in downstream of the former coupler 27, where both MMI couplers are primarily made of InP. The first MMI coupler 27 receives the signal light SG and the local light LO. Although not explicitly illustrated in FIG. 2B, a phase shifter made of waveguides are interposed between the first MMI coupler 27 and the second MMI coupler 28 to advance or delay the phase of the local light by $\pi/2$ (90°). Two MMI couplers, 27 and 28, generate four optical signals; namely, I, /I, Q, and /Q, where I means a component of the signal light SG having a phase coincident to a phase of the local light LO, which is called as "in-phase", while, Q means a component having a phase quadrature to that of the local light LO; and a prefix slash "/" means that components has a phase opposite to that of components without the slash.

That is, the optical hybrid 7 of the present embodiment may output the component of the signal light SG in-phase to the local light LO by the differential form and another component having a phase quadrature to that of the local light LO also by the differential form. Because the optical module 1 of the present embodiment provides two MMI devices 30 and the signal light SG is split into two parts depending on the polarizations and entering the respective MMI devices 30. Accordingly, the optical module 1 may recover four data contained in the signal light SG, namely, Ix, Qx, Iy, and Qy, in the differential form, where x and y means the directions of the polarizations.

Four components of the signal light output from the optical hybrid 7 enters the PDs 26, and the PDs 26 detect magnitudes thereof. Even when the optical hybrid 7 receives only the signal light, that is, no local light enters the optical hybrid 7, the optical hybrid 7 may output four components of the signal light described above. Also, even when no signal light SG enters the optical hybrid 7, that is, only the local light LO enters, the optical hybrid 7 may output four components of the local light.

Most of conventional MMI devices primarily made of semiconductor materials often have an arrangement where waveguides constituting the MMI couplers are formed on a silicon substrate and PDs formed independent of the Si substrate optically couple with the waveguides on the Si substrate. The MMI device 30 of the present embodiment monolithically integrates the PDs 26 with the optical hybrid 7 including the first MMI coupler 27 and the second MMI coupler 28 on a common semiconductor substrate made of indium phosphide InP, which enhances the integrity and may form the optical hybrid 30 in compact.

Figure 3:
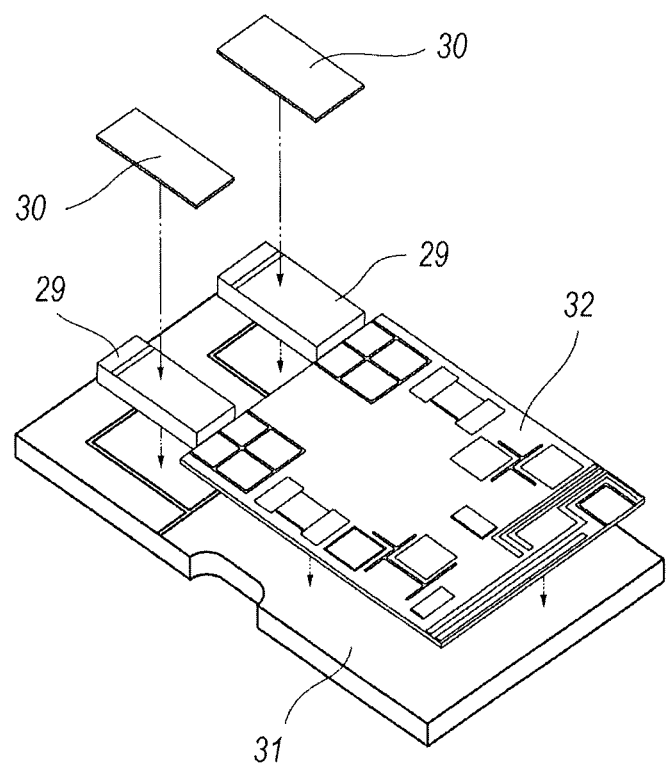
FIG. 3 shows a process of mounting, on the first base, the optical hybrid through the carrier and the second base.

FIG. 3 is a perspective view showing the MMI devices 30 mounted on a first base 31 through carriers 29. The first base 31 also mounts the second base 32 on which the optical components described above are mounted. The carrier 29 and the second base 32, which may be made of alumina (Al$_2$O$_3$), have rectangular plane shapes. The first base 31 may be made of copper tungsten (CuW) containing copper by 10% and have a rectangular slab shape with a thickness of 0.55 mm. The carrier 29 has a thickness of 0.50 mm, and the MMI device 30 has a thickness of 0.10 mm.

An MMI device made of semiconductor materials may make physical dimensions thereof compact compared with another MMI device made of dielectric materials because semiconductor materials generally have dielectric constants greater than that of dielectric materials, which inevitably makes the physical dimensions of the MMI couplers smaller. Accordingly, faint deviations of the physical dimensions strongly affect optical performances of the MMI device, in particular, phases and amplitudes of the four outputs described above widely scatters. Ideally, differences between the positive phase outputs, I and Q, and the negative phase outputs, /I and /Q, are invariant before and after the installation of the MMI device 30 on the carrier 29. The differences between before and after the installation are practically requested to be within a preset range.

A differential amplitude between the positive phase output and the negative phase output may be evaluated by providing test beams to the local port and the signal port through respective lensed fibers and monitoring the outputs of the PDs 26 for a bared MMI device 30, which means the MMI device 30 is not mounted on the carrier 29. The outputs of the PDs 26 are detectable through probing. The differential amplitude A$_{diff}$ is given by:

$$A_{diff} = 10 \times \text{Log}_{10}(Pn/Pp),$$

where Pn and Pp are magnitude of the negative phase output and the positive phase output, respectively. MMI devices showing the differential amplitude A$_{diff}$ greater than a preset threshold are provided for subsequent processes as passed devices; but those showing the differential amplitude smaller than the preset threshold are dropped out from subsequent processes.

However, in spite of the selection above, some MMI devices show the differential amplitude smaller than the preset threshold after the assembly thereof on the carrier 29. One speculative reason for showing smaller differential amplitude after the assembly is a difference in a linear expansion co-efficient between a semiconductor material (InP) of the MMI device 30 and alumina (Al$_2$O$_3$) of the carrier 29. Specifically, the alumina has the linear expansion co-efficient greater than that of InP. The MMI device 30 is mounted on the carrier 29 by heating the carrier 29 to a temperature around 300° C. in order to solve solder on the carrier 29, then cooling down the carrier 29 with the MMI device 30 thereon to a room temperature. The carrier 29 largely shrinks compared with the MMI device 30 during the thermal process above; accordingly, the MMI device 30 receives a compressive stress after the assembly, which may induce or enhance the deviation in the differential amplitude evaluated for the bared arrangement of the MMI device. The present invention reduces the stress induced in the MMI device during the thermal process and decreases the deviation of the differential amplitude.

Figure 4:
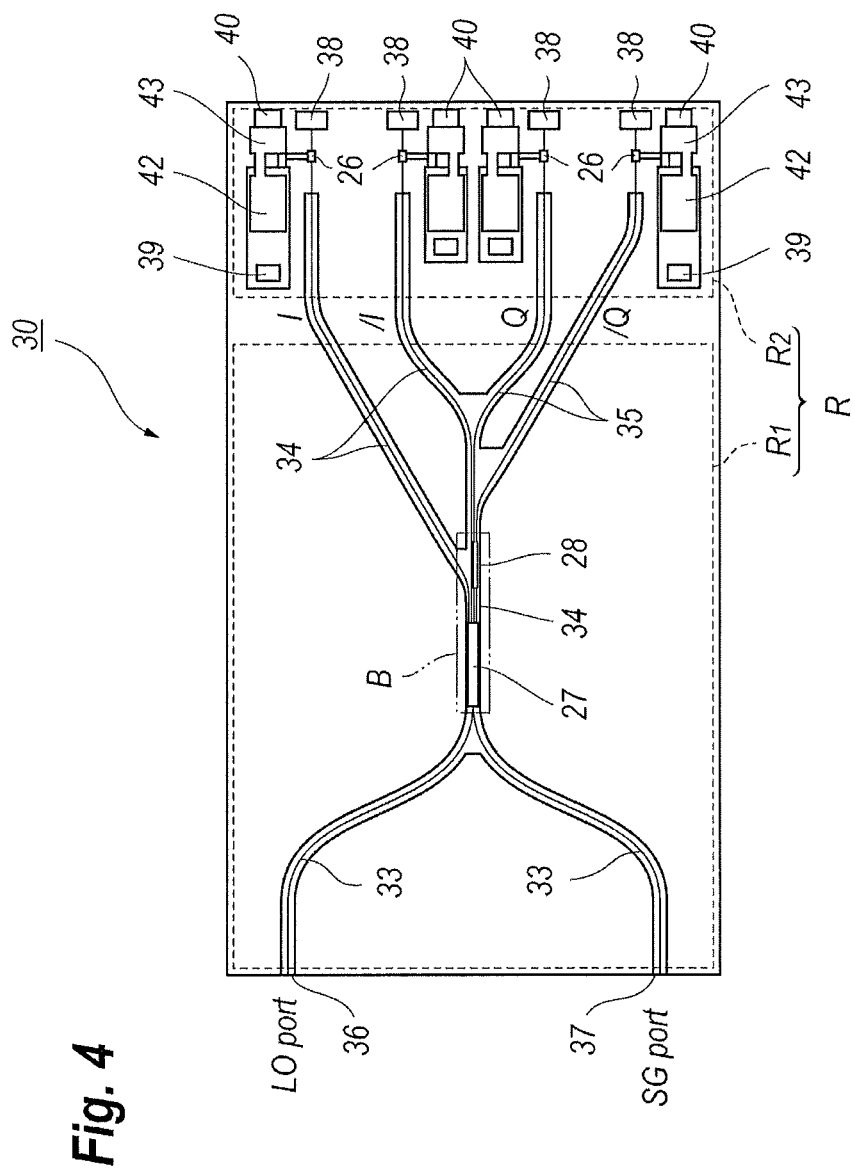
FIG. 4 is a plan view of the optical hybrid.

FIG. 4 is a plan view of the MMI device 30 of the present embodiment. The MMI device 30 has a rectangular plane shape with a longitudinal direction along which the signal light SG and the local light LO propagate. The MMI device 30 provides the MMI couplers, 27 and 28, in a center portion of the plane shape. Waveguides, 33 and 34, for providing the light to the signal light and the local light to the MMI couplers, 27 and 28, and those extracting the interfered light from the MMI couplers, 27 and 28, run along the longitudinal direction of the MMI device 30. The MMI device 30 may have a length of 4.1 mm along the longitudinal direction, while, a width of 1.4 mm along the lateral direction perpendicular to the longitudinal direction.

Specifically, the first MMI coupler 27 outputs two waveguides 33 toward the signal port 37 and the local port 36 along the longitudinal direction; while, outputs four waveguides 34 toward an opposite side where the PDs 26 are arranged. The local port 36 and the signal port 37 are arranged in respective ends of the waveguides 33. The second MMI coupler 28 outputs two waveguides 34 toward the first MMI coupler 27 and other two waveguides 35 toward the PDs 26.

The MMI device 30 of the present embodiment provides relatively widened plane size because the curvatures of the waveguides, 33 to 35, are necessary to be set small. The PDs 26, which directly couple with the waveguides 34 and 35, are monolithically formed within the MMI device 30 and have a type of waveguide PD. That is, the PDs 26 have a semiconductor stack including a p-i-n or n-i-p structure, where the i-type layer operates as an active layer to convert photons into conductive carriers. The PDs 26 of the present embodiment receive the light directly from the waveguides, 34 and 35, without passing through the conductive p-type and/or n-type layers, that is, the light enters the i-type layer directly from the side thereof.

The PDs 26 accompany with signal pads 38 connected to anodes of the PDs 26, while, biased in cathodes thereof through respective resistive elements connected to bias pads 39. MIM (metal-insulator-metal) capacitors 42 are connected between the cathodes pads 39 and ground pads 40 which are connected to a back metal R of the InP substrate through via holes 43.

The MMI device 30 provides the back metal R in the back surface of the substrate. The back metal R is divided into two parts, one of which R1 overlaps with an area B where the MMI couplers, 27 and 28, are formed, and the other part R2 overlaps with the PDs 26. The physically divided back metal may reduce the leak current of the PDs 26. When the former back metal R1 is connected to the latter back metal R2; the currents leaked from the bias pads 39 to the back metal R2 through the waveguides, 34 and 35, increase.

Figure 5:
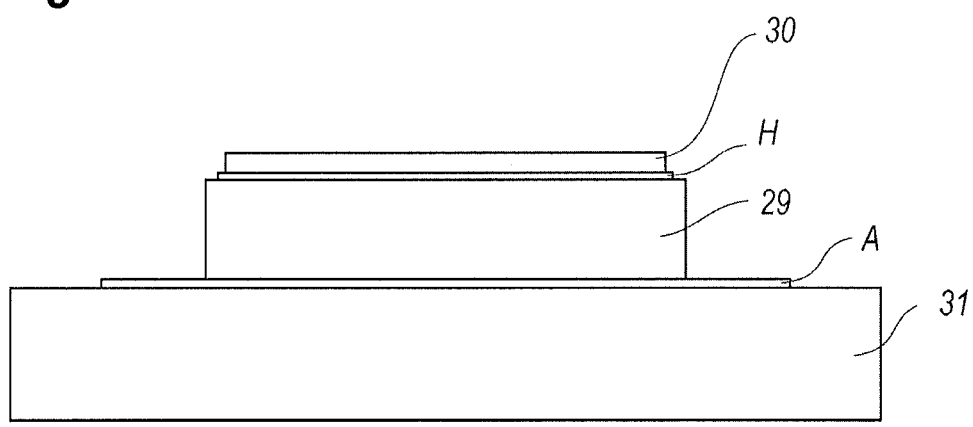
FIG. 5 is a side view of the optical hybrid mounted on the first base through the carrier.

FIG. 5 shows a side view of the MMI device 30 mounted on the first base 31 through the carrier 29 made of alumina ($Al_2O_3$). The carrier 29 is mounted on the first base 31 by, for instance, conductive resin A; while, the MMI device 30 is mounted on the carrier 29 by, for instance, eutectic solder H made of AuSn.

Figure 6A:
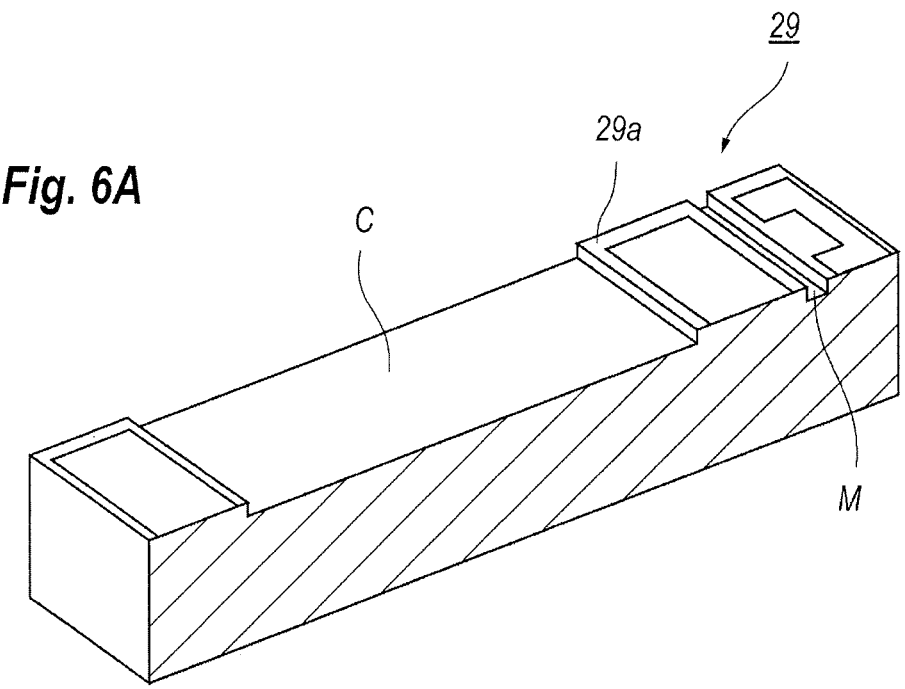
FIG. 6A is a perspective cross section of the carrier.
Figure 6B:
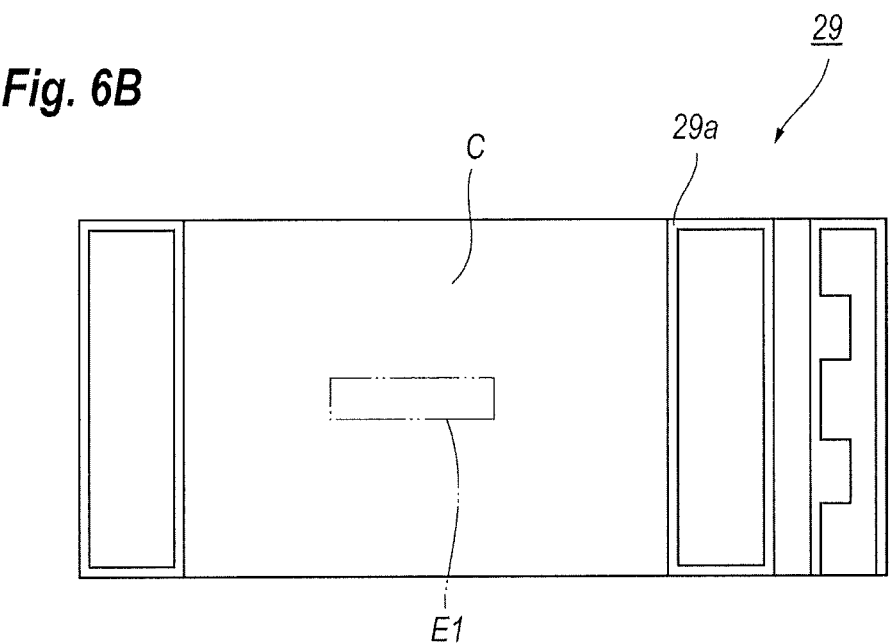
FIG. 6B is a top view of the carrier.

The carrier 29 has shape of a rectangular block with a longitudinal direction and a lateral direction. FIG. 6A is a perspective view of a longitudinal cross section of the carrier 29, and FIG. 6B shows a plan view of the carrier 29. The carrier 29 provides a step C in a top surface 29a facing the MMI device 30. The step C extends in an overall lateral width of the carrier 29 so as to cover an area E1, which corresponds to the area B in the MMI device 30 where the first and second MMI couplers, 27 and 28, are formed. The step C has a depth measured from the top surface 29a of, for instance, 80 µm. When the MMI device 30 is mounted on the carrier 29 in the top surface 29a thereof, the area B in the back surface of the InP substrate is apart from the step C. Thus, the stress induced in the MMI device 30 due to the difference in the linear expansion co-efficient may be suppressed and the deviation of the differential amplitude appearing in the outputs of the MMI device 30 after the installation on the carrier 29 may be considerably reduced. Next, advantages of the carrier 29 of the present embodiment will be described as comparing with other types of carriers.

Figure 7A:
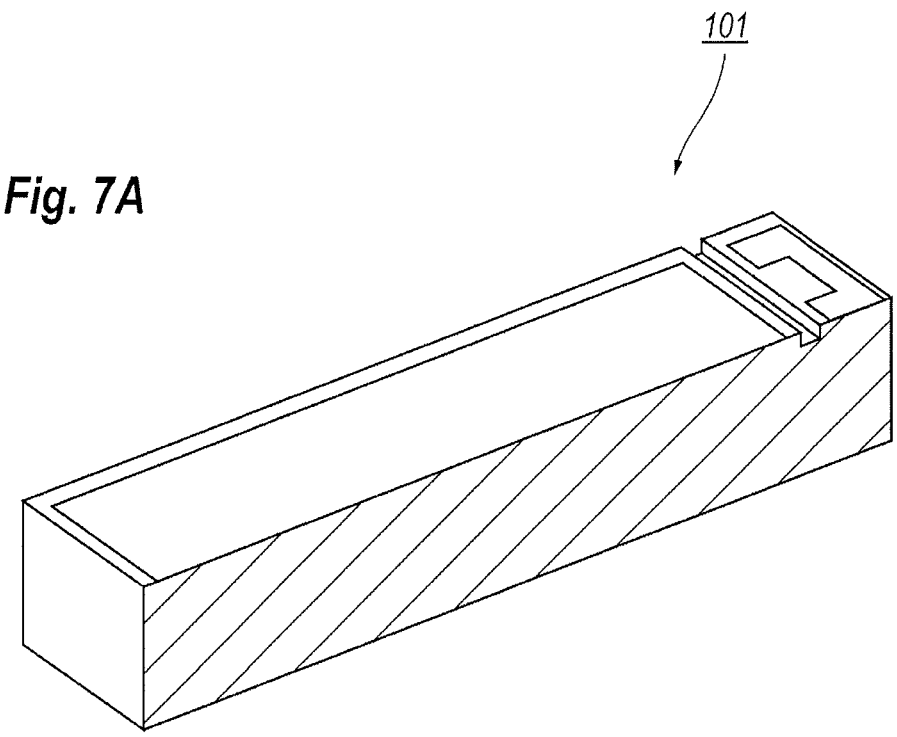
FIG. 7A is a perspective cross section of a carrier comparable to the carrier shown in FIG. 6A.
Figure 7B:
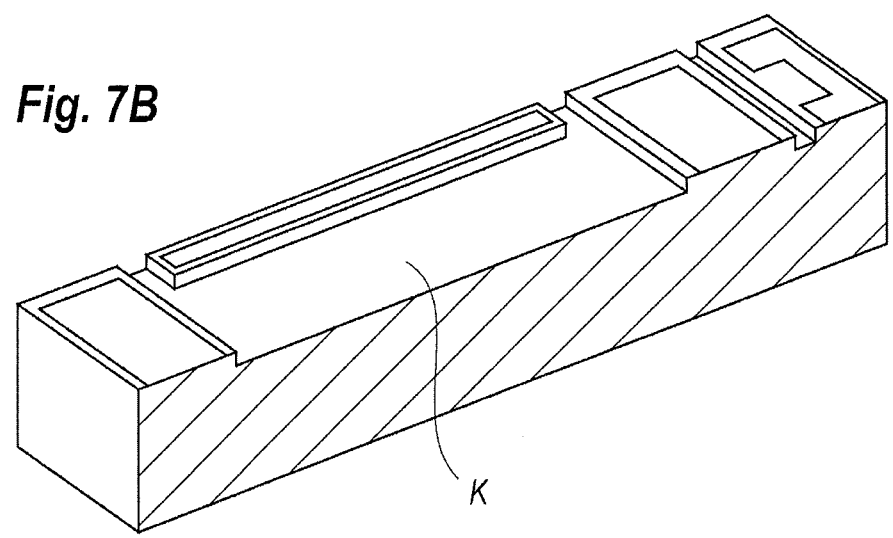
FIG. 7B is also a perspective cross section of still another carrier comparable to the carrier shown in FIG. 6A.

FIG. 7A shows a perspective cross section of a carrier 101 according to the first example comparable to the present embodiment shown in FIG. 6A, and FIG. 7B also shows a perspective cross section of another carrier 102 according to the second comparable example. The former carrier 101 shown in FIG. 7A provides a rectangular block same with the present invention, but does not provide any steps C on the top surface thereof. The latter carrier 102 shown in FIG. 7B provides a rectangular block and a step K, but the step K is terminated in respective sides of the carrier 102. That is, the carrier 102 provides the step K whose top level is lowered from areas surrounding the step K but the MMI device, when mounted on the carrier 102, is fixed to the carrier 102 in peripheries thereof.

The MMI devices 30 when it is mounted on the respective carriers, 29, 101, and 102, are evaluated in the stresses induced in the center area B thereof where the MMI couplers, 27 and 28, are formed. The process of mounting the MMI device 30 on the carriers, 29, 101, and 102, are carried out as follows: raising the temperature of the carries, 29, 101, and 102, to 300° C. which is higher that a melting temperature of solder and attaching the MMI device 30 onto the carriers, 29, 101, and 102; then cooling the temperature down to the room temperature, which is 25° C. At 300° C., substantially no stresses are induced in the MMI device 30 because the solder is melted.

FIG. 8A shows the linear expansion co-efficient of InP, and FIG. 8B shows that of alumina ($Al_2O_3$). Materials, namely, InP for the MMI device 30, $Al_2O_3$ for the carriers, 29, 101, and 102, and copper tungsten (CuW) for the first base 31, inherently have respective expansion co-efficient. Accordingly, when the temperature of the carriers, 29, 101, and 102, are cooled down from 300° C. to the room temperature 25° C., mechanical stresses are induced between the members due to differences between physical dimensions of the members caused by the temperature difference of 275° C. In particular, the difference in the expansion co-efficient between InP and $Al_2O_3$ becomes dominate; because the difference between InP and CuW may be moderated by interposing $Al_2O_3$ therebetween.

Indium phosphide (InP) in the expansion co-efficient thereof in the unit of 10-6/K varies from 6.98 to 4.67 for temperatures of 300° C. to 25° C., as shown in FIG. 8A; on the other hand, alumina ($Al_2O_3$) varies also in the expansion co-efficient thereof from 7.65 to 5.40, as shown in FIG. 8B. Although not shown in figures, copper tungsten (CuW) in the expansion co-efficient thereof also varies from 7.39 to 6.66 for those temperatures. However, the variation of CuW is smaller than that of InP and $Al_2O_3$. Moreover, as described above, the first base 31 made of CuW is indirectly in contact to the MMI device 30 made of InP, that is, the first base 31 interposes the carriers, 29, 101, and 102, against the MMI device 30; accordingly, the first base 31 made of CuW secondarily contributes the stress. Referring to FIGS. 8A and 8B, the expansion co-efficient of $Al_2O_3$ exceeds that of InP in whole temperatures from 25° C. to 300° C. Then, mounting the MMI device 30 on the carriers, 29, 101, and 102, at the temperature 300° C., and cooling the temperature down to the room temperature 25° C.; the carriers, 29, 101, and 102, more shrinks compared with the MMI device 30, which means that the MMI device 30 bents downward and a stress, namely, compressive stress for recovering a plane status is always induced in the MMI device 30.

Figure 9A:
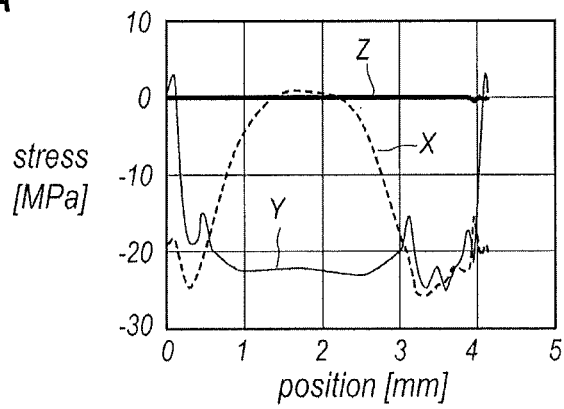
FIG. 9A shows stresses caused in the carrier of the present embodiment.
Figure 9B:
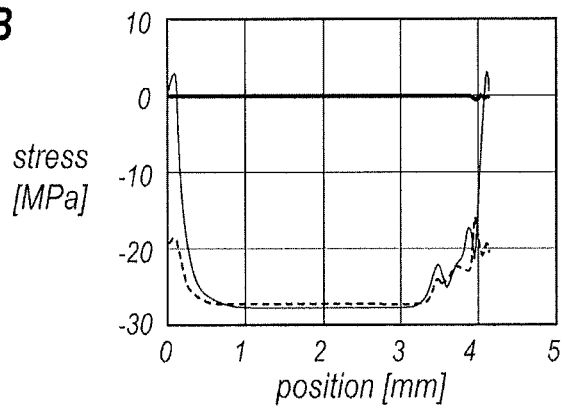
FIG. 9B shows stresses caused in another carrier shown in FIG. 7A, and FIG. 9C also shows stresses caused in still another carrier shown in FIG. 7B.
Figure 9C:
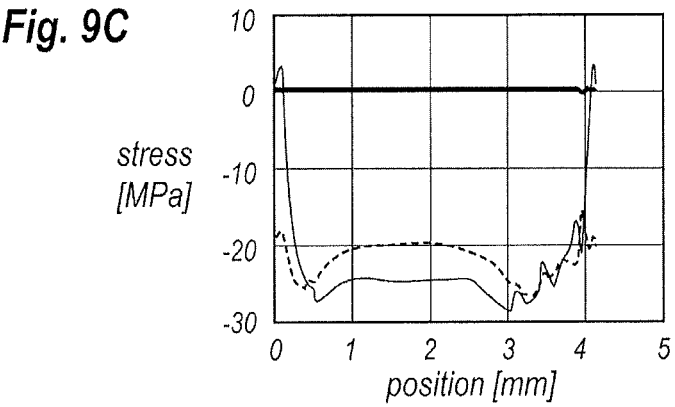

FIGS. 9A to 9C show stresses induced in the MMI devices 30 mounted on the respective carriers, 29, 101, and 102, along the longitudinal direction of the MMI devices 30. In FIGS. 9A to 9C, X, Y, and Z correspond to the longitudinal, the lateral, and the vertical stresses induced in the MMI devices 30, respectively. As shown in FIG. 9B, the first comparative carrier 101, which has the conventional arrangement for mounting the MMI device 30 in a whole top surface thereof, induces a stress of about −28 MPa in whole longitudinal positions of the MMI device 30. For the second comparative carrier 102 shown in FIG. 9C, which has the arrangement that peripheries of the MMI device 30 is fixed to the carrier 102, also induces the stress with magnitude substantially same with that of the first conventional carrier 101. Because the respective lateral sides of the carrier 102 are fixed to the MMI device 30, the stress induced in the MMI device 30 becomes substantially same with that of the first comparative carrier 101.

On the other hand, for the carrier 29 of the present embodiment as shown in FIG. 9A, because the longitudinal sides thereof are fixed to the MMI device 30, which means that the stress substantially same with those appearing in the comparative carriers, 101 and 102, is induced in the MMI device 30. However, for the lateral direction Y, the respective ends thereof are free from the carrier 29, the stress induced in the MMI device 30 along the lateral direction, Y-direction, behaves in a manner different from those appearing in the comparative carriers, 101 and 102, and becomes substantially zero in a center portion from 1.3 to 2.1 mm. The MMI couplers, 27 and 28, as shown in FIG. 4, are disposed in the center area B of the MMI device 30, and the stress appearing in this center area B affects the optical performance of those MMI couplers, 27 and 28. The carrier 29 of the present embodiment, as shown in FIG. 9A, induces substantially no stress in the center area B.

Thus, the carrier 29 of the present embodiment provides the step C widely including the area E1 that faces the center area B of the MMI device 30 and extending in the overall lateral width thereof. That is, the carrier 29 is not in contact to the MMI device 30 in an area widely including the center E1 and extending in the overall the lateral width thereof, which may effectively suppress the stress to be induced in the center area B of the MMI device 30 where the MMI couplers, 27 and 28, are formed.

Second Embodiment

Figure 10A:
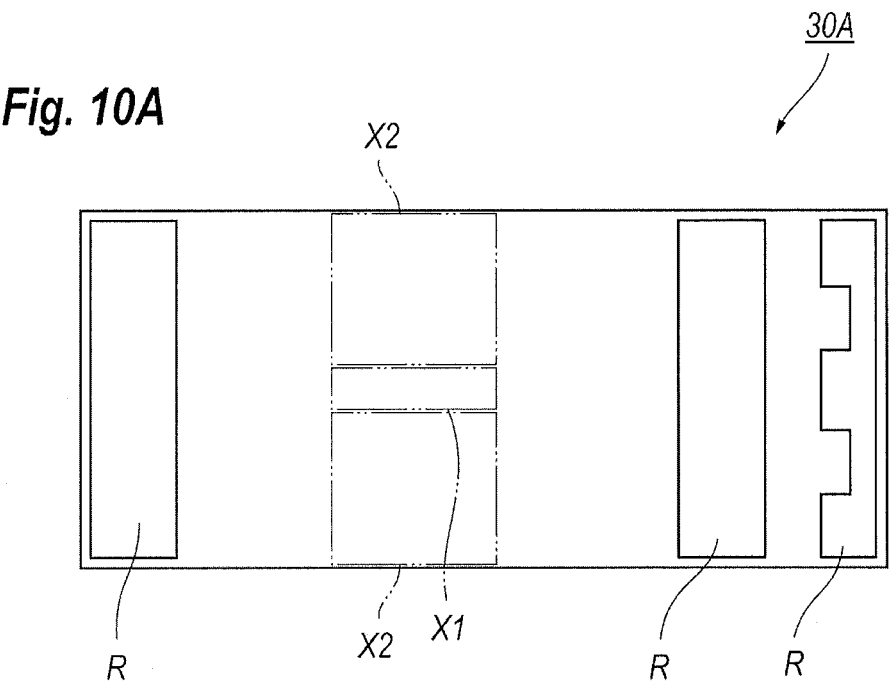
FIG. 10A is a top view of another optical hybrid according to the second embodiment of the present invention.
Figure 10B:
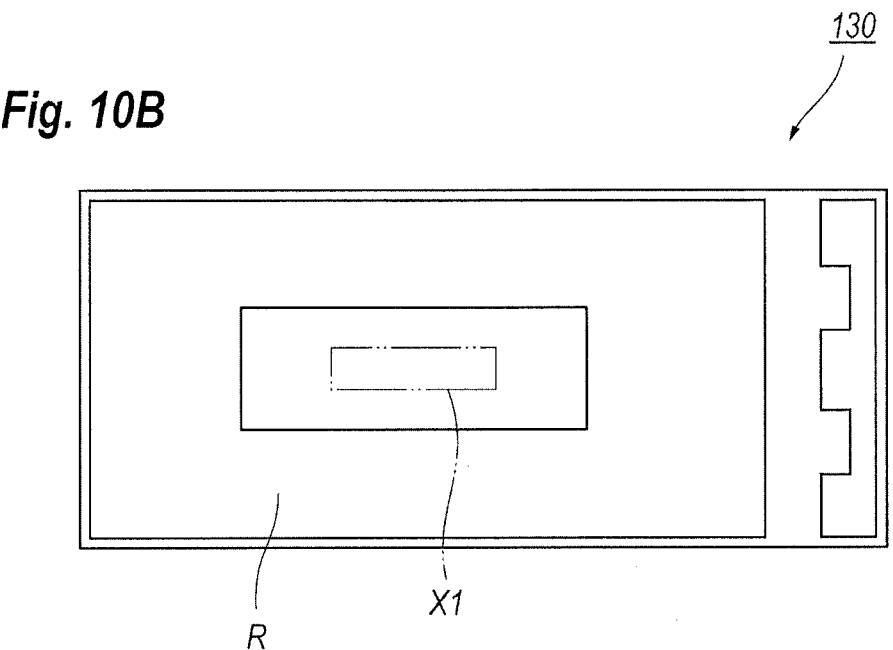
FIG. 10B is a top view of an optical hybrid comparable to the optical hybrid shown in FIG. 10A.

The optical module 1 of the first embodiment of the present invention provides the step C in the top surface 29a of the carrier 29 that fully extends in the overall lateral width of the carrier 29, which makes a gap against the MMI device 30 mounted on the carrier 29. An optical module of the second embodiment, as shown in FIG. 10A, removes the back metal R of the MMI device 30A in an overall lateral width from one end to the other end of the MMI device 30A, which forms an area not closely in contact to a carrier 29 even when the MMI device 30A is mounted on the carrier 29.

Other arrangements except for the back metal R are substantially same with those of the first embodiment. Areas in the back surface of the MMI device 30A where the back metal R is formed are closely in contact to the carrier 29 by solder H; but other areas not covered with the back metal R repels the solder H, which means that, even when the MMI device 30A is mounted on the carrier 29, the other areas forms gaps against the carrier 29, or not rigidly fixed to the carrier 29.

The MMI device 30A of the second embodiment will be compared with an MMI device 130 comparable to the present MMI device 30A. The comparable MMI device 130 provides an area overlapping with the MMI couplers, 27 and 28, not covered with the back metal R, but leaving the back metal R in respective lateral ends thereof. For such MMI device 130, the stress in the MMI device 130 is substantially same with that for an MMI device 30 leaving the back metal R in the whole back surface thereof. However, the MMI device 30A of the second embodiment, because the lateral ends thereof are substantially free from the carrier 29, induces substantially no stress in the lateral direction.

Thus, the MMI device 30A of the second embodiment removes the back metal R in the area X1 that overlaps with the MMI couplers, 27 and 28, and extending in the overall lateral end to the other lateral end. That is, the MMI device 30A provides the back metal R in areas except for the area X1 overlapping with the MMI couplers, 27 and 28, and the additional areas laterally extending from the area X1 to the respective ends of the MMI device 30A. Accordingly, the stress to be induced in the area X1 overlapping with the MMI couplers, 27 and 28, may substantially disappear, and the deviation of the differential amplitude in the output of the MMI device 30A before and after the installation of the MMI device 30A on the carrier 29 may be reduced.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical module, comprising:
a multi-mode interference (MMI) device that includes a semiconductor substrate having a multi-mode interference (MMI) coupler and waveguides, the waveguides longitudinally extending from the MIMI coupler in a top surface of the semiconductor substrate; and
a carrier that mounts the MMI device thereon through solder,
wherein the MIMI device has an area in a back surface of the semiconductor substrate, the area being not fixed to the carrier, overlapping with the MIMI coupler in the top surface of the semiconductor substrate, and extending in an overall lateral width of the substrate.

2. The optical module of claim 1,
wherein the carrier has a step extending in an overall lateral width thereof, the step corresponding to the area of the semiconductor substrate of the MIMI device and forming a gap against the semiconductor substrate of the MIMI device.

3. The optical module of claim 1,
wherein the back surface of the semiconductor substrate has a back metal except for the area not fixed to the carrier, the back metal being fixed to the carrier through the solder.

4. The optical module of claim 3,
wherein the back metal is made of gold (Au).

5. The optical module of claim 1,
wherein the carrier has expansion co-efficient greater than expansion co-efficient of the semiconductor substrate.

6. The optical module of claim 5,
wherein the carrier is made of aluminum oxide ($Al_2O_3$), and the semiconductor substrate is made of indium phosphide (InP).

7. The optical module of claim 5,
wherein the semiconductor substrate at the area thereof receives a compressing stress greater than 20 MPa along the longitudinal direction but substantially no compressing stress along the lateral direction.

8. The optical module of claim 1,
wherein the MMI coupler includes a 2×4 MMI coupler and a 2×2 MMI coupler optically coupled with the 2×4 MMI coupler.

9. The optical module of claim 8,
wherein the 2×4 MMI coupler and the 2×2 MMI coupler have rectangular plane shape having longitudinal edges along which the waveguides are longitudinally extended.

10. The optical module of claim 1,
wherein the carrier is mounted on a base made of copper tungsten (CuW).

11. The optical module of claim 1,
wherein the MIMI device monolithically integrates photodiodes (PDs) optically coupled with the MMI coupler through the waveguides.

* * * * *